UNITED STATES PATENT OFFICE 2,271,400

MERCAPTOTHIAZINE SPIRO COMPOUNDS AND PROCESS OF MAKING SAME

Paul Swithin Pinkney, Wilmington, Del., assignor to E. I. du Pont de Nemours & Company, Wilmington, Del., a corporation of Delaware No Drawing. Application August 16, 1940, Serial No. 352,981

13 Claims. (Cl. 260—243)

This invention relates to heterocyclic sulfur-nitrogen organic compounds.

This invention has as an object the preparation of new insecticides. A further object is the preparation of new pickling inhibitors. Another object is the preparation of sensitizers for photographic emulsions. Another object is the preparation of new rubber chemicals, e. g., rubber vulcanization accelerators. A still further object is the preparation of new organic compounds.

These objects are accomplished by the following invention wherein ammonia and carbon disulfide are reacted with a saturated alicyclic ketone having at least five ring atoms and at least one alpha-carbon atom, i. e., alpha to the carbonyl, linked to two hydrogen atoms, the ketone being present either as such or as the aldol-type self-condensation product thereof. The term "self-condensation" is used as in Conant, The Chemistry of Organic Compounds, page 118.

In a preferred method of carrying out the process of the present invention one mole of the alicyclic ketone or one-half mole of its aldol-type self-condensation product is mixed in a reactor fitted with a sealed mechanical stirrer, reflux condenser, thermometer, and addition device, with 1 to 1.5 moles of aqueous ammonia. To this mixture there is added with stirring and cooling ½ to 1 mole of carbon disulfide at such a rate that the exothermic heat of reaction does not cause excessive loss of carbon disulfide. It is generally best to keep the temperature of the reaction mixture below 40° C. When the exothermic reaction is complete, stirring is continued for an hour without cooling. The reaction product separates either as a solid or as an insoluble liquid which crystallizes on purification and cooling. The product is separated by filtration or by decantation, as the case may be, and is washed with water. It is purified by crystallization from a suitable solvent such as alcohol or toluene.

The alicyclic ketones used in the process of this invention may be obtained, for example, by dehydrogenation of alicyclic alcohols as disclosed in Lazier U. S. Patents 2,163,284 and 1,895,516.

The more detailed practice of the invention is illustrated by the following examples, wherein parts given are by weight. There are of course many forms of the invention other than these specific embodiments.

Example I

Three hundred nine (309) parts of cyclohexanone (95% purity) and 280 parts of ammonium hydroxide (28% ammonia) are mixed in a reactor fitted with a sealed mechanical stirrer, reflux condenser, and thermometer. One hundred fifty-two (152) parts of carbon disulfide is added over a period of 30 minutes through the reflux condenser with stirring. The temperature of the dark red reaction mixture is kept below 40° C. by cooling in an ice bath. Stirring is continued for 2 hours at room temperature, after which the exothermic reaction has subsided. On standing, the reaction mixture separates into two layers. The viscous dark red lower layer is washed several times with water by decantation and is then taken up in 37% hydrochloric acid. The heavy, brownish-red layer is discarded. The aqueous acid solution is diluted with cold water to precipitate the orange-yellow reaction product which is separated by filtration. The yield of this crude product is 265 parts. After purification by crystallization from alcohol or toluene, the bright orange crystalline product melts at 192 to 192.5° C.

Analysis

| Calculated for $C_{13}H_{19}NS_2$ | Found |
|---|---|
| C 61.66 | 61.79 |
| H 7.51 | 7.38 |
| N 5.53 | 5.81 |
| S 25.30 | 25.25 |

This product has the probable formula

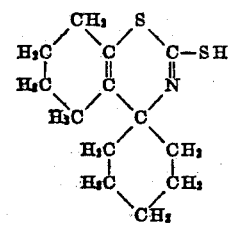

i. e. 5,6,7,8 - tetrahydro - 2 - mercaptospiro(1,3,4-benzothiazine-4,1'-cyclohexane).

When 1 mole of 2-cyclohexylidenecyclohexanone or 2-(1-hydroxycyclohexyl)cyclohexanone is reacted in place of 2 moles of cyclohexanone with ammonia and carbon disulfide according to the above process, the same product, 5,6,7,8-tetrahydro-2-mercaptospiro(1,3,4-benzothiazine-4,1'-cyclohexane), is obtained.

This material is effective as a pickling inhibitor, an insecticide, an accelerator for the vulcanization of rubber (giving the rubber a red color which fades on exposure to light), and as a sensitizer for photographic emulsions.

*Example II*

According to the procedure of Example I, 61 parts of carbon disulfide is added over a period of 15 minutes to a mixture of 66 parts of cyclopentanone and 72 parts of ammonium hydroxide (28% ammonia). An exothermic reaction sets in at once. The mixture becomes orange-red in color and after about 10 minutes the reaction product separates as a yellow solid. The product is collected on a filter and is purified by solution in chloroform followed by precipitation with petroleum ether or by crystallization from alcohol. The yield of brownish-yellow crystalline material is 14 parts. It melts at 108 to 110° C., solidifies and remelts at 122 to 125° C. It is soluble in dilute sodium hydroxide and insoluble in dilute acid.

The product has the probable formula

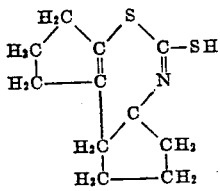

i. e., is 5,6-dihydro-2-mercaptospiro(1,3,4-cyclopenta(e)-thiazine-4,1'-cyclopentane).

When one mole of 2-cyclopentylidenecyclopentanone or 2-(1-hydroxycyclopentyl)cyclopentanone is reacted in place of 2 moles of cyclopentanone with ammonia and carbon disulfide as in the above example the same product, namely 5,6-dihydro-2-mercaptospiro(1,3,4-cyclopenta(e)thiazine-4,1'-cyclopentane), is obtained.

When 2-methylcyclohexanone is reacted with ammonia and carbon disulfide in accordance with the above description, 8,2'-dimethyl-5,6,7,8-tetrahydro-2-mercaptospiro(1,3,4-benzothiazine-4,1'-cyclohexane) is obtained. When 3,3,4-trimethylcyclohexanone is reacted with ammonia and carbon disulfide in accordance with the above description, a mixture of two isomeric products is obtained, 5,5,6,3',3',4'-hexamethyl- and 6,7,7,3',3',4'-hexamethyl-5,6,7,8-tetrahydro-2-mercaptospiro(1,3,4-benzothiazine- 4,1' - cyclohexane). Similarly, when 2-methylcyclopentanone is reacted with ammonia and carbon disulfide according to the above description, 5,6-dihydro - 7,2' - dimethyl - 2 -mercaptospiro(1,3,4-cyclopenta(e)thiazine-4,1'-cyclopentane) is obtained, and when 3,3,4-trimethylcyclopentanone is used, a mixture of two isomeric products is obtained, 5,6-dihydro-5,5,6,3',3',4'-hexamethyl-2-mercaptospiro(1,3,4 - cyclopenta(e)thiazine- 4,1'-cyclopentane) and 5,6-dihydro-5,6,6,3',3',4'-hexamethyl - 2 - mercaptospiro(1,3,4 -cyclopenta-(e)thiazine-4,1'-cyclopentane).

Any saturated alicyclic ketone having at least five ring atoms and at least one alpha-carbon atom, i. e., alpha to the carbonyl, linked to two hydrogen atoms, including 3-methylcyclohexanone, 4-methylcyclohexanone, 2-ethylcyclohexanone, 3-ethylcyclohexanone, 2-propylcyclohexanone, 2-isopropylcyclohexanone, 4-isopropylcyclohexanone, 2-butylcyclohexanone, 4-butylcyclohexanone, 2-phenylcyclohexanone, 4-phenylcyclohexanone, 4-cyclopentylcyclohexanone, 2-cyclohexylcyclohexanone, 4-cyclohexylcyclohexanone, 2-cyclohexylmethylcyclohexanone, 2-benzylcyclohexanone, 4-benzylcyclohexanone, 2-phenethylcyclohexanone, 2-phenoxycyclohexanone, 2,3-dimethylcyclohexanone, 2,2-dimethylcyclohexanone, 2,4-dimethylcyclohexanone, 2,5-dimethylcyclohexanone, 3,5-dimethylcyclohexanone, 2,2-dipropylcyclohexanone, 4,4-dimethylcyclohexanone, 2,2-dipropylcyclohexanone, 2-isopropyl-5-methylcyclohexanone, 3-isopropyl-6-methylcyclohexanone, 2-benzyl - 4 - methylcyclohexanone, 2 - methyl-2-phenylcyclohexanone, 2-methyl-2-phenethylcyclohexanone, 4 - methyl-2-phenethylcyclohexanone, 2-benzyl-2-propylcyclohexanone, 3,5-diphenylcyclohexanone, 2,2,5-trimethylcyclohexanone, 3,3,5-trimethylcyclohexanone, 3-methyl-2,2 - dipropylcyclohexanone, 4 - methyl - 2,2-dipropylcyclohexanone, 3-methylcyclopentanone, 2-ethylcyclopentanone, 2-isopropylcyclopentanone, 2-propylcyclopentanone, 3-propylcyclopentanone, 2-hexylcyclopentanone, 2-heptylcyclopentanone, 2-octylcyclopentanone, 2-cyclopentylcyclopentanone, 2-phenylcyclopentanone, 2-phenethylcyclopentanone, 2-benzylcyclopentanone, 2,2-dimethylcyclopentanone, 3-ethyl-3-methylcyclopentanone, 3-ethyl-4-methylcyclopentanone, 2-isopropyl-3-methylcyclopentanone, 2-butyl-3-methylcyclopentanone, 2-isobutyl-3-methylcyclopentanone, 2-hexyl-3-methylcyclopentanone, 4-isopropyl-3-methylcyclopentanone, 2,4,4-trimethylcyclopentanone, 3,3,4,4-tetramethylcyclopentanone, cycloheptanone, cyclononanone, camphor, octahydro-1(2)-naphthalenone, octahydro - 2(1) -naphthalenone, octahydro - 3-methyl-1(2)-naphthalenone, octahydro-4-phenyl-2(1)-naphthalenone, 3,4-dihydro-1(2)-naphthalenone, 3,4-dihydro-6,7-dimethoxy-1(2)-naphthalenone, 3,4-dihydro-3,4-dimethyl-1(2)-naphthalenone, 3,4-dihydro-5,6-dimethyl-1(2)-naphthalenone, and 3,4-dihydro-4,7-dimethyl-1(2)-naphthalenone may be employed to react with ammonia and carbon disulfide according to the process of the invention.

A preferred embodiment of this invention is the reaction with carbon disulfide and ammonia of a saturated alicyclic ketone having 5 or 6 ring atoms and at least 1 alpha carbon atom linked to 2 hydrogen atoms, since such ketones are more readily available than are those with more than 6 ring atoms. A more preferred embodiment is the reaction with carbon disulfide and ammonia of a cyclohexanone having at least 1 alpha carbon atom linked to 2 hydrogen atoms, since when a cyclohexanone is used, the product is easier to purify and is obtained in better yields than when a cyclopentanone is used. The most preferred embodiment is the reaction of cyclohexanone itself with carbon disulfide and ammonia since the reaction takes place faster and under more mild conditions than when substituted cyclohexanones are used.

The products are 2-mercaptothiazines having the 5–6 positions carbons a portion of, i. e., fused with a carbocyclic ring and the 4 position a portion of, i. e., spiro united with another carbocyclic ring. As illustrated above, when the ketone is unsymmetrically substituted in two positions other than the alpha positions, mixtures of two structurally isomeric products are obtained. When two or more ketones are used mixtures are obtained. All of the products are, however, 2-mercaptothiazines having the 5 and 6 carbons fused with a carbocyclic ring and the 4 carbon a member by spiro union of a second carbocyclic ring. The initial ketones and consequently the products may bear as substituents in the ring alkyl, aryl, arylene, or aralkyl groups which may be saturated or unsaturated, provided the unsaturation is not conjugated with the carbonyl group, branched or straight chain and substituted or not by inert groups, e. g., the hydroxyl, mercapto, halogen and tertiary amine groups.

The products have the probable formula

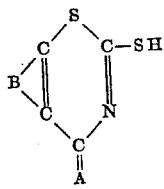

wherein

is the bivalent residue of the enol form

of a saturated alicyclic ketone of at least five ring atoms having at least one of the carbons alpha to the carbonyl carbon attached to two hydrogens and $A=C=$ is the bivalent nonoxo residue of the same ketone or another saturated alicyclic ketone of at least five ring atoms having at least one of the carbons alpha to the carbonyl carbon attached to two hydrogens.

In the compounds derived from a cyclohexanone

is a bivalent six-membered alicyclic ring saturated except for a double bond between the two carbons having the free valences and $A=C=$ is a saturated bivalent six-membered alicyclic radical with its two valences stemming from the same carbon.

The rate of reaction in this process is dependent on the temperature. In many cases, it is desirable to apply heat in excess of the heat of reaction to speed up the reaction. In some cases, it is necessary to apply heat in order to start the reaction. The temperature at atmospheric pressure is limited by the vapor pressures of the reactants. To use higher temperatures, it is necessary to carry out the reaction in a closed reactor. In such a case, the upper temperature limit, so far as is known, is the point of thermal decomposition of reactants and products—usually around 200° C. The temperature may be as low as 25° C., although at this temperature the rate of reaction is usually very low and much more time is required. The pressure depends on the vapor pressures of reactants, products, and diluents at the temperature employed and is limited to that which the equipment used is capable of withstanding.

Although the reaction may be carried out in the absence of an inert liquid diluent, operation in the presence of a liquid diluent which may or may not be a solvent for one, two, or all the reactants, or for the products of the reaction is preferred. As such inert liquid diluents, there may be used hydrocarbons, alcohols, ethers, tertiary amines or halogenated aliphatic or aromatic hydrocarbons in which the halogen is stable toward ammonia under the conditions of the reaction. Examples of suitable liquid diluents are water, benzene, kerosene, diethyl ether, dioxan, "Methyl Cellosolve," ethanol, methanol, "Cellosolve," cyclohexanol, pyridine, carbon tetrachloride, chlorobenzene, ethyl tetrachlorobenzene, etc.

The proportions of reactants are not limited to those used in the above examples. For each gram molecule of ketone or for each ½ gram molecule of its aldol-type self-condensation product, i. e., for each mol of original ketone, there must be used at least ½ gram molecule and preferably one to one and one-half gram molecules of ammonia and at least ½ gram molecule and preferably a slight excess of carbon disulfide. The reactants may all be mixed together at once, in which case efficient cooling may be required to keep the reaction under control, one reactant may be added to a mixture of the other two, or a mixture of any two reactants may be added to the third. Thus in certain cases, the reaction may be carried out using ammonium dithiocarbamate instead of carbon disulfide and ammonia. Before addition of carbon disulfide and ammonia, the ketone may be caused to undergo an aldol-type self-condensation by any known method, e. g., by heating with a dehydrating catalyst such as zinc chloride as disclosed in Ber. 59B, 2085 (1926) or sulfuric acid in methanol, as disclosed in Ber. 40, 157 (1907). When an acid catalyst of such nature is used, sufficient additional ammonia or alkali should be used to neutralize it.

The products of this invention are useful as insecticides, rubber chemicals, photographic chemicals, and pickling inhibitors.

The above description and examples are intended to be illustrative only. Any modification of or variation therefrom which conforms to the spirit of the invention is intended to be included within the scope of the claims.

What is claimed is:

1. Process of preparing polynuclear mercaptothiazines, which comprises reacting ammonia, carbon disulfide and a member of the class consisting of alicyclic ketones of at least five ring atoms having at least one ring carbon atom alpha to the carbonyl carbon linked to two hydrogen atoms and aldol-type self-condensation products of said ketones.

2. Process of claim 1 wherein at least one-half mol of ammonia and at least one-half mol of carbon disulfide are used per mol of original ketone.

3. Process of preparing polynuclear mercaptothiazines which comprises reacting at least one-half mol each of ammonia and carbon disulfide with one mol of a saturated alicyclic ketone of at least five ring atoms having at least one of the carbons alpha to the carbonyl carbon attached to two hydrogen atoms.

4. Process of preparing polynuclear mercaptothiazines which comprises reacting at least one-half mol each of ammonia and carbon disulfide with one mol of a saturated alicyclic ketone having from five to six ring atoms and having at least one carbon alpha to the carbonyl carbon attached to two hydrogen atoms.

5. Process of preparing polynuclear mercaptothiazines which comprises reacting at least one-half mol each of ammonia and carbon disulfide with one mol of a cyclohexanone having at least one carbon alpha to the carbonyl group attached to two hydrogen atoms.

6. Process of preparing polynuclear mercaptothiazines which comprises reacting at least one-half mol each of ammonia and carbon disulfide with one mol of cyclohexanone.

7. Process of preparing polynuclear mercaptothiazines which comprises reacting at least one-half mol each of ammonia and carbon disulfide with one mol of a cyclopentanone having at least one carbon alpha to the carbonyl group attached to two hydrogen atoms.

8. Process of preparing polynuclear mercaptothiazines which comprises reacting at least one-half mol each of ammonia and carbon disulfide with one mol of cyclopentanone.

9. A condensation product of ammonia, carbon disulfide, and a member of the class consisting of alicyclic ketones of at least five ring atoms having at least one ring carbon alpha to the carbonyl carbon linked to two hydrogen atoms and aldol-type self-condensation products of said ketone in the proportion of at least one-half mole ammonia and at least one-half mole of carbon disulfide per mole of ketone, said product having the probable formula

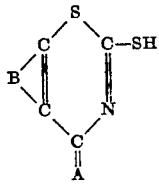

wherein

is the residue

of the enol form

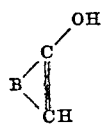

of said ketone, and

is the non-oxo residue of the keto form of said ketone.

10. A condensation product of one mol of ammonia, one mol of carbon disulfide, and two mols of at least one saturated alicyclic ketone of at least five ring atoms having at least one of the carbons alpha to the carbonyl carbon attached to two hydrogen atoms, said product having the probable formula

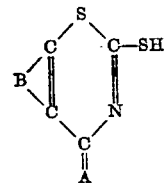

wherein

is the residue

of the enol form

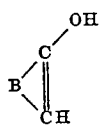

of said ketone, and

is the non-oxo residue of the keto form of said ketone.

11. A condensation product of one mol of ammonia, one mol of carbon disulfide and two mols of at least one saturated alicyclic ketone of five to six ring atoms having at least one of the carbons alpha to the carbonyl attached to two hydrogen atoms, said product having the probable formula

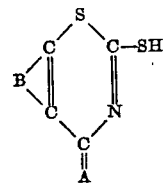

wherein

is the residue

of the enol form

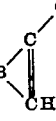

of said ketone, and

is the non-oxo residue of the keto form of said ketone.

12. A condensation product of one mol of ammonia, one mol of carbon disulfide, and two mols of at least one cyclohexanone having at least one carbon alpha to the carbonyl group attached to two hydrogen atoms, said product having the probable formula

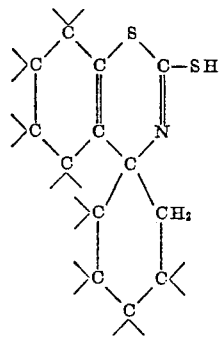

wherein the

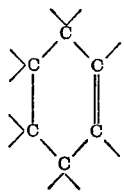

represents a six-membered alicyclic ring having a double bond between the two carbons having the free valences and having the remaining members of the ring saturated and

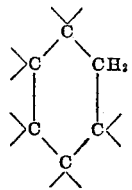

represents a saturated mononuclear six-membered alicyclic divalent radical having the two free valences stemming from the same carbon.

13. A condensation product of one mol of ammonia, one mol of carbon disulfide and two mols of cyclohexanone, said product having the probable formula

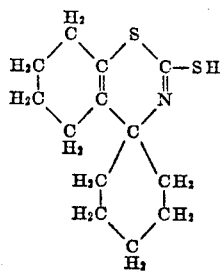

PAUL SWITHIN PINKNEY.

CERTIFICATE OF CORRECTION.

Patent No. 2,271,400. January 27, 1942.

PAUL SWITHIN PINKNEY.

It is hereby certified that error appears in the printed specification of the above numbered patent requiring correction as follows: Page 2, first column, lines 32 to 40, for that portion of the formula reading and that the said Letters Patent should be read with this correction therein that the same may conform to the record of the case in the Patent Office.

Signed and sealed this 24th day of March, A. D. 1942.

Henry Van Arsdale,
Acting Commissioner of Patents.

(Seal)